United States Patent Office 3,085,984

Patented Apr. 16, 1963

1

3,085,984

POLYURETHANE PLASTIC CONTAINING AN 8-HYDROXY QUINOLINE AND PROCESS FOR PREPARING SAME

Eberhart Degener, Leverkusen, and Fritz Steinfatt, Opladen, Germany, assignors to Farbenfabriken Bayer Aktiengesellschaft, Leverkusen, Germany, a corporation of Germany No Drawing. Filed Apr. 1, 1960, Ser. No. 19,141
Claims priority, application Germany Apr. 6, 1959
8 Claims. (Cl. 260—2.5)

This invention relates to improved polyurethane plastics and an improved process for the preparation thereof. More particularly, this invention relates to improved polyurethane plastics which are resistant to microorganisms and indeed are in most cases toxic to microorganisms.

Polyurethane plastics have found commercial utility in many fields, including household articles such as, for example, mattresses, toys, containers and the like and, therefore, it is desirable to make these articles preservative against microorganisms. Some of the most effective germicides, such as phenols and hydroxy benzoic acids, depend for their effectiveness on having hydroxyl groups which would react with isocyanates. Therefore, it has not been possible to incorporate this type of germicide into the polyurethane plastic at the time that it was prepared and have it retain its effectiveness in the final product. Where germicides containing hydroxyl groups have been contemplated to treat polyurethane plastics, it has only been possible to use them for surface treatment of finished articles because the hydroxyl group is very reactive with an isocyanate group. The necessity of treating polyurethane plastics after they have been produced to make them germicidal adds another step in their production and, consequently, increases the expense and time necessary to prepare a polyurethane plastic.

It is an object of this invention to provide improved polyurethane plastics which have a germicide containing free hydroxyl groups incorporated therein. Another object of this invention is to provide an improved process for the preparation of polyurethane plastics which contain a preservative against microorganisms. Another object of this invention is to provide an improved process for incorporating an antifungal and antibacterial agent into a polyurethane plastic. Another object of this invention is to provide an improved process for the preparation of a polyurethane plastic which is resistant to microorganisms without the necessity of an aftertreatment of the plastic. Still another object of this invention is to provide improved cellular polyurethane plastics which contain a preservative against microorganisms. A further object of the invention is to provide improved cellular polyurethane plastics which are suitable for use in the production of mattresses, pillows, toys, bath mats and the like and which contain throughout a preservative against microorganisms. Another object of the invention is to provide improved nonporous polyurethane plastics which contain a germicide having free hydroxyl groups.

The foregoing objects and others which will become apparent from the following description are accomplished in accordance with the invention, generally speaking, by providing polyurethane plastics containing an 8-hydroxy quinoline. The invention, therefore, provides polyurethane plastics which contain an 8-hydroxy quinoline as a preservative against microorganisms. In accordance with a preferred embodiment of the invention, polyurethane plastics containing 8-hydroxy quinoline or a halogenated 8-hydroxy quinoline are prepared by mixing an organic compound containing at least two active hydrogen-containing groups as determined by the Zerewitinoff method with 8-hydroxy quinoline or a halogenated 8-hydroxy quinoline and then combining the resulting mixture with an organic polyisocyanate to prepare a polyurethane plastic. Of course, the polyurethane plastic may be treated with the 8-hydroxy quinoline after it has been prepared as by spraying, dipping or the like. This technique will produce a polyurethane plastic containing an 8-hydroxy quinoline which will have a germicidal effect but is not as good as mixing the 8-hydroxy quinoline into the polyurethane plastic during its preparation so that it is incorporated and present throughout. If the reaction between the organic polyisocyante and the active hydrogen-containing compound is carried out under substantially anhydrous conditions and in the absence of a blowing agent, a homogeneous, i.e. nonporous, polyurethane plastic will be obtained. If the reaction is carried out in the presence of water or other suitable blowing agent, a cellular polyurethane plastic is obtained.

2

An important feature of the invention is that the 8-hydroxy quinolines remain intact during the reaction of the organic polyisocyanate with an active hydrogen containing compound and are present in the final polyurethane plastic as such. In other words, the hydroxyl group of 8-hydroxy quinoline does not react with the organic polyisocyanate and, consequently, retains its effect as a preservative against microorganisms in the final product. The polyurethane plastics of the invention may, therefore, have incorporated therein a germicide instead of merely having a coating of the germicide. A most advantageous feature of the invention is that cellular polyurethane plastics which have open cells can be produced in accordance with the invention which will have germicidal properties throughout. This feature of the invention is particularly important in the production of mattresses, pillows and the like for use in hospitals, hotels, etc. since in the interest of general hygiene and for special preserving and disinfecting purposes the articles will contain throughout a germicide in places impossible to reach after the article has been produced.

It is possible in accordance with the process of the invention to combine the 8-hydroxy quinoline with an organic polyisocyanate in a first step and then react the resulting mixture with an organic compound containing at least two active hydrogen-containing groups. However, in the absence of other active hydrogen-containing groups the hydroxyl group of an 8-hydroxy quinoline may react to some extent with the organic polyisocyanate and, therefore, it is preferred to combine the 8-hydroxy quinoline with at least one of the active hydrogen-containing components and then combine the resulting mixture with the organic polyisocyanate. If this latter procedure is followed, substantially all of the 8-hydroxy quinoline will remain intact without reaction of the hydroxyl group with an organic polyisocyanate in the final product.

Any suitable 8-hydroxy quinoline may be used including 8-hydroxy quinoline per se. and the halogenated derivatives of 8-hydroxy quinoline such as, for example, 2-chloro-8-hydroxy quinoline,
3-chloro-8-hydroxy quinoline,
4-chloro-8-hydroxy quinoline,
5-chloro-8-hydroxy quinoline,
6-chloro-8-hydroxy quinoline,
7-chloro-8-hydroxy quinoline,
2-bromo-8-hydroxy quinoline,
3-bromo-8-hydroxy quinoline,
4-bromo-8-hydroxy quinoline,
5-bromo-8-hydroxy quinoline,
6-bromo-8-hydroxy quinoline,
7-bromo-8-hydroxy quinoline,
2-iodo-8-hydroxy quinoline,
3-iodo-8-hydroxy quinoline, 4-iodo-8-hydroxy quinoline,
5-iodo-8-hydroxy quinoline,
6-iodo-8-hydroxy quinoline,
7-iodo-8-hydroxy quinoline and the like.

It is also possible to use halogenated 8-hydroxy quinolines which contain more than one halogen substituent, such as, for example, 2,4-dichloro-8-hydroxy quinoline,
5,7-dichloro-8-hydroxy quinoline,
2,7-dichloro-8-hydroxy quinoline,
4,6-dichloro-8-hydroxy quinoline,
5,6-dichloro-8-hydroxy quinoline,
2,4-dibromo-8-hydroxy quinoline,
5,7-dibromo-8-hydroxy quinoline,
2,7-dibromo-8-hydroxy quinoline,
4,6-dibromo-8-hydroxy quinoline,
5,6-dibromo-8-hydroxy quinoline,
2,4-diiodo-8-hydroxy quinoline,
5,7-diiodo-8-hydroxy quinoline,
2,7-diiodo-8-hydroxy quinoline,
4,6-diiodo-8-hydroxy quinoline,
5,6-diiodo-8-hydroxy quinoline,
2,5,7-trichloro-8-hydroxy quinoline,
3,5,7-trichloro-8-hydroxy quinoline,
2,4,6-trichloro-8-hydroxy quinoline,
5,6,7-trichloro-8-hydroxy quinoline,
2,5,7-tribromo-8-hydroxy quinoline,
3,5,7-tribromo-8-hydroxy quinoline,
2,4,6-tribromo-8-hydroxy quinoline,
5,6,7-tribromo-8-hydroxy quinoline,
2,5,7-triiodo-8-hydroxy quinoline,
3,5,7-triiodo-8-hydroxy quinoline,
2,4,6-triiodo-8-hydroxy quinoline,
5,6,7-triiodo-8-hydroxy quinoline and the like.

Of course, mixed halogenated derivatives of 8-hydroxy quinoline can also be used such as, for example, 5-chloro-7-bromo-8-hydroxy quinoline, 5-chloro-7-iodo-8-hydroxy quinoline and the like. It is essential to use an 8-hydroxy quinoline and not one of the other hydroxy quinolines, as 7-hydroxy quinoline, for example, because these others will react and have no germicidal effect. The amount of the 8-hydroxy quinolines is not critical, however, germicidal amounts should be used and preferably from about 0.1 percent to about 5 percent by weight based on the weight of the polyurethane plastic is used.

Any suitable organic polyisocyanate may be used for the preparation of the polyurethane plastics of the invention including aromatic, aliphatic or heterocyclic polyisocyanates such as, for example, tetramethylene diisocyanate,
pentamethylene diisocyanate,
octamethylene diisocyanate,
dodecamethylene diisocyanate,
3,3'-diisocyanato dipropyl ether,
xylylene diisocyanates,
p,p'-diphenylmethane diisocyanate,
$\beta,\beta'$-diphenylpropane-4,4'-diisocyanate,
undecamethylene diisocyanate,
m-phenylene diisocyanate,
p-phenylene diisocyanate,
1-methyl phenylene 2,4-diisocyanate,
naphthylene 1,4-diisocyanate,
naphthylene 1,5-diisocyanate,
2,6-toluylene diisocyanate,
1,3,5-benzene triisocyanate,
p,p',p''-triphenylmethane triisocyanate,
furfurylidene diisocyanate and the like.

Of course, the aliphatic polyisocyanates can be cycloaliphatic such as, 1,4-cyclohexyl diisocyanate, for example. Also, the addition products of polyisocyanates with a deficient quantity of a low molecular weight alcohol, such as 1,4-butane diol, glycerine, trimethylol propane, the hexanediols and hexanetriols and addition products of the afore-mentioned polyisocyanates with low molecular weight polyesters, such as castor oil, may also be used, as well as the reaction products of the afore-mentioned polyisocyanates with acetals as described in copending application Serial No. 821,360. Also suitable are the isocyanate polymers described in German patent specification Nos. 1,022,789 and 1,027,394, as laid open to inspection. Mixtures of organic isocyanates may also be employed. The process according to the present invention can also be used for the foaming of prepolymers obtained from the afore-mentioned organic compounds containing at least two active hydrogen-containing groups and an excess of polyisocyanate by adding water.

Any suitable organic compound containing at least two active hydrogen-containing groups as determined by the Zerewitinoff method may be used. The Zerewitinoff method is described in Kohler, Journal Am. Chem. Soc. 49, 3181 (1927). Such active hydrogen-containing groups are reactive with an isocyanate group. Preferably the active hydrogen-containing group is an hydroxyl group but it can also be a primary amino group, a secondary amino group, a carboxyl group, a urethane group, a urea or other group adapted to react with an —NCO group.

Any suitable organic compound having active hydrogen-containing groups as defined above may be used and may be a polyester, a polyhydric polyalkylene ether, a polyhydric polythioether, a polyacetal, the polymer of carbon monoxide and an olefine or other natural or synthetic resin which contains active hydrogen-containing groups. Preferably, the organic compound containing active hydrogen-containing groups has a molecular weight of at least about 500, an hydroxyl number of not more than about 225 and an acid number of not more than about 10. The polyester may be prepared by condensing any suitable polyhydric alcohol with any suitable polycarboxylic acid. The polycarboxylic acid may be either aromatic or aliphatic. Examples of suitable polycarboxylic acids are adipic acid, succinic acid, phthalic anhydride, terephthalic acid, maleic aid, malonic acid and the like including those disclosed in U.S. Patent Reissue 24,514. Examples of suitable polyhydric alcohols include ethylene glycol, diethylene glycol, hexanetriol, glycerine, trimethylol propane and the like including those disclosed in U.S. Patent Reissue 24,514.

The polyhydric polyalkylene ether may be prepared by condensing an alkylene oxide or by condensing an alkylene oxide with a polyhydric alcohol. It may also be prepared by polymerizing tetrahydrofuran. Examples of suitable oxides include ethylene oxide, propylene oxide, butylene oxide and the like. Examples of suitable polyhydric alcohols are ethylene glycol, diethylene glycol, glycerine, pentaerythritol, sorbitol, hexanetriol, trimethylol propane and the like. It is preferred to use a lower alkylene oxide having up to five carbon atoms. Polyurethanes may also be prepared from compounds having secondary hydroxyl groups, such as, for example, polyhydric polyoxypropylenes. Such compounds are ordinarily prepared by condensing propylene oxide with a trihydric alcohol or a glycol, such as glycerine, trimethylol propane, hexanetriol, ethylene glycol, diethylene glycol and the like. If desired, the polyhydric polyalkylene ether can be prepared from two or more alkylene oxides, such as, for example, ethylene and propylene oxides.

The polythioether may be prepared by any suitable process, such as, by condensing thiodiglycol, for example. Methods for making suitable polythioethers are disclosed in U.S. Patents 2,862,972 and 2,900,368.

An amino alcohol, such as ethanolamine, can be included in the preparation of the polyester in order to produce a polyesteramide suitable for use in this invention. For example, a polyesteramide prepared from ethylene glycol, ethanolamine and adipic acid may be used.

The polyacetal may be prepared by any suitable process, such as, for example, by condensing an aldehyde, such as formaldehyde with a polyhydric alcohol, such as ethylene glycol or one of the other polyhydric alcohols disclosed above for making polyesters.

The copolymer of carbon monoxide and an olefine may be one of those disclosed in U.S. Patent 2,839,478, such as, for example, an ethylene-propylene-carbon monoxide copolymer. Natural resins such as castor oil may also be used.

The polyurethane products of the invention may be either porous or nonporous products. The porous or cellular polyurethane plastics are produced in accordance with the invention by mixing the organic polyisocyanate with an organic compound containing at least two active hydrogen-containing groups as determined by the Zerewitinoff method in a first step to prepare a prepolymer having terminal —NCO groups and then reacting said prepolymer with water to prepare a cellular polyurethane product or in the alternative the organic polyisocyanate, organic compound containing at least two active hydrogen-containing groups and the water is mixed in a single step to prepare a cellular polyurethane product. As set forth above the 8-hydroxy quinolines employed in accordance with the process of the invention as germicides are preferably mixed with the organic compound containing at least two active hydrogen-containing groups prior to combination with the organic polyisocyanate. Alternately, the 8-hydroxy quinolines may be combined with water and then combined with the other ingredients to prepare a cellular polyurethane product. The preparation of cellular polyurethane plastics is preferably carried out in the presence of a catalyst such as, for example, a tertiary amine, such as, ethylene diamine, N-methyl morpholine, N-ethyl morpholine and the like or a tin catalyst such as, dibutyl tin dilaurate, dibutyl tin di-2-ethyl hexoate, stannous octoate and the like. The mixing of the components may be effected by hand but it is preferably carried out mechanically, for example, in the manner described in U.S. Reissue Patent 24,514 to Hoppe et al. issued August 12, 1958. An open celled polyurethane plastic is obtained by compressing the initially prepared porous polyurethane plastic to at least about 50 percent of its original height and preferably 75 to 90 percent of its original height. This results in rupture of many of the cell walls.

Foam stabilizing agents, emulsifiers and the like may be added. Silicone oils are particularly useful, such as polydimethyl siloxanes for systems based on polyesters and polyoxyalkylene block copolymers as disclosed in U.S. Patent 2,834,748 for polyhydric polyalkylene ether systems.

Nonporous polyurethane plastics are preferably prepared under substantially anhydrous conditions by reacting an excess of an organic polyisocyanate with an organic compound containing at least two active hydrogen-containing groups in a first step to prepare a prepolymer having terminal —NCO groups and then reacting this product with a cross-linking agent such as an aliphatic diol to prepare the nonporous polyurethane plastics. Suitable processes for the preparation of this type of reaction product may be found in U.S. Patents 2,729,618 and 2,620,516.

The cellular products of the invention are useful for many applications including both thermal and sound insulation and the like. Due to having the germicide incorporated therein they find particular utility in upholstery articles, mattresses, pillows, bath mats and the like. The nonporous polyurethane plastics are useful as adhesives and for the preparation of various molded objects, for example, toys, O-rings, valve seals, printing rollers, conveyor belts and the like.

Polyurethane plastics having an 8-hydroxy quinoline incorporated therein are toxic to most microorganisms. In other cases they inhibit the growth of microorganisms. Thus, they may be said to be antifungal and antibacterial polyurethane plastics. The term "germicide" is intended to cover both of these effects.

The invention is further illustrated by the following examples in which the parts are by weight unless otherwise indicated.

The germicidal effect of the 8-hydroxy quinolines is apparent from the growth-free zone which is formed around polyurethane plastics containing one of these compounds when they are laid on inoculated agar plates. This effect is shown in Tables 1 and 2.

Table 1 shows a summarized evaluation of the germicidal effect of polyurethane plastics prepared in accordance with the invention. Evaluation is based on the germ-inhibiting zones on nutrient agar plates in tests carried out which trichophyton mentagrophytes, *Stc. aurens* and *Bct. fluorescens*.

*Table 1*

| Example | Concentration, percent | Active substance | Germicidal effect |
|---|---|---|---|
| 1 | 1 | Di-tert.-butyl cresol | 0 |
| 2 | 1 | p-Nitrophenol | 0 |
| 3 | 1 | o-hydro-oxydiphenyl | 0 |
| 4 | 1 | Benzylphenol | 0 |
| 5 | 2 | p-hydro-oxybenzoic acid | 0 |
| 6 | 2 | p-hydro-oxybenzoic acid ethylester | 0 |
| 7 | 1 | Dihydroxy dichloro diphenylmethane | 0 |
| 8 | 5 | 2-Hydroxy-5-chlorodiphenyl | 0 |
| 9 | 1 | Salicylanilide | 0 |
| 10 | 1 | Dichloro salicylanilide | 0 |
| 11 | 1 | Tetrachloro dihydroxy diphenylsulphide. | 0 |
| 12 | 0.5 | 5-Chloro-8-hydroxy quinoline | 9 |
| 13 | 1 | do | 14 |
| 14 | 0.5 | 6-Chloro-8-hydroxy quinoline | 1 |
| 15 | 1 | 5,7-Dichloro-8-hydroxy quinoline | 8 |
| 16 | 0.5 | 8-Hydroxy quinoline | 1 |
| 17 | 0 | no additive | 0 |

The evaluation of germicidal effect is based on an arbitrary numerical system in which the figures are average values calculated from the numbers of Table 2 for three different tests. Thus, for instance, for Example 18 a figure of 9 is given calculated as follows: 6+7+14=27, divided by 3 results in 9. The figure 0 in Examples 1–11 and 17 therefore indicates logically that no germicidal effect is to be observed at all.

The polyurethane plastics employed in the foregoing table are prepared as follows:

A polyester is made from 128 parts by weight of diethylene glycol, 8 parts by weight of trimethylol propane and 175 parts by weight of adipic acid (hydroxyl number 59, acid number 1.2). 100 parts by weight of this polyester are dried in vacuo of 20 mm. Hg and 145° C. while stirring. When the temperature drops to 80°, the amount of active substance as indicated in Table 1 and 7.2 parts by weight of toluylene diisocyanate are added. The liquid melt is poured into heated and waxed molds. After 2 hours at 110° C. the material which can be used as printers rollers can be taken from the molds. Shore hardness 21°.

In Table 2 the growth-free zone on inoculated nutrient agar plates covered with polyurethane plastics is shown.

*Table 2*

| Examples | Concentration, percent | Active substance | Microorganisms | | |
|---|---|---|---|---|---|
| | | | *Stc. aur.* | *Bct. fluor.* | *Trichoph. mentagr.* |
| 18 | 0.5 | 5-chloro-8-hydroxy quinoline. | 6 | 7 | 14 |
| 19 | 1.0 | do | 11 | 12 | 20 |
| 20 | 0.5 | 5,7-dichloro-8-hydroxy quinoline. | 5 | 8 | 9 |
| 21 | 1.0 | do | 5 | 9 | 10 |
| 22 | 0.5 | do | 2 | 4 | 2 |
| 23 | 0.5 | 6-chloro-8-hydroxy quinoline. | 1 | 1 | 2 |

In the foregoing table the polyurethane plastic which is used to cover the agar plate in Examples 18 and 19 is prepared by mixing the indicated weight percentage of the 8-hydroxy quinoline with a polyester having a molecular weight of about 2200, an hydroxyl number of about 60 and an acid number of less than about 1 which is obtained from adipic acid, diethylene glycol and trimethylol propane. 100 parts by weight of this polyester are mixed with 1.5 parts by weight of dimethyl benzyl amine, 1.5 parts by weight of oxethylated oxydiphenyl, 3 parts by weight of a 50% aqueous solution of sodium castor oil sulphate, and 2.5 parts by weight of water. After adding 50 parts by weight of a 65:35 mixture of 2.4- and 2.6-toluylene diisocyanate a cellular polyurethane plastic is obtained having a bulk density of 35 kg./$m^3$.

The cellular polyurethane plastic to be employed in Examples 20 and 21 is prepared by reacting about 100 parts by weight of a prepolymer made of an adipic acid—ethylene glycol-polyester and toluylene diisocyanate (NCO content 10.3%) with 1.5 parts by weight of dimethyl benzyl amine, 1.5 parts by weight of oxethylated oxydiphenyl, 1.5 parts by weight of a 50% aqueous solution of sodium castor oil sulphate, the indicated amount of the 8-hydroxy quinoline derivative, 1.9 parts by weight of water and 5 parts by weight of toluylene diisocyanate to give a cellular product.

The polyurethane plastic employed in Examples 22 and 23 is suitable for the use as a printing roller and is obtained by mixing the indicated percentage of an 8-hydroxy quinoline with an hydroxy polyester obtained from 128 parts by weight of diethylene glycol, 8 parts by weight of trimethylol propane and 175 parts by weight of adipic acid and having a molecular weight of about 2200, a hydroxyl number of 59 and an acid number of 1.2. 100 parts by weight of this polyester are then dried in vacuo of 25 mm. Hg and 145° C. while stirring. When the temperature drops to 80°, 8.5 parts by weight of toluylene diisocyanate are added. The liquid melt is poured into heated and waxed molds which are then held at 110° C. for 2 hours. The molding is taken from the mold and has a Shore hardness of 32°.

It is to be understood that any other suitable 8-hydroxy quinoline, organic polyisocyanate, organic compound containing at least two active hydrogen-containing groups, bacterial culture or the like could have been used in the foregoing examples in accordance with the preceding disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In a process for the preparation of a polyurethane plastic containing a germicide by a process which comprises reacting an organic compound containing at least two active hydrogen containing groups as determined by the Zerewitinoff method with an organic polyisocyanate in the presence of said germicide, the improvement which comprises mixing said organic compound containing at least two active hydrogen-containing groups with from about 0.1 to about 5 percent by weight of an unreacted 8-hydroxy quinoline having a free hydroxyl group and thereafter combining the resulting mixture with an organic polyisocyanate.

2. The product of the process of claim 1.

3. The process of claim 1 wherein said 8-hydroxy quinoline is an halogenated 8-hydroxy quinoline.

4. The product of the process of claim 3.

5. The process of claim 1 wherein said 8-hydroxy quinoline is 5-chloro-8-hydroxy quinoline.

6. The product of the process of claim 5.

7. The process of claim 1 wherein said polyurethane plastic is a cellular polyurethane plastic.

8. The product of the process of claim 7.

References Cited in the file of this patent

UNITED STATES PATENTS 2,957,832 Gmitter et al. ------------ Oct. 25, 1960

FOREIGN PATENTS 797,576 Great Britain ------------ July 2, 1958

OTHER REFERENCES

G. F. Reddish: "Antiseptics Disinfectants Fungicides and Sterilization," second edition, copyright 1957, pages 547 to 549, published by Lea and Febiger, Philadelphia, Pa.